United States Patent [19]

Narang et al.

[11] Patent Number: 5,998,559
[45] Date of Patent: *Dec. 7, 1999

[54] SINGLE-ION CONDUCTING SOLID POLYMER ELECTROLYTES, AND CONDUCTIVE COMPOSITIONS AND BATTERIES MADE THEREFROM

[75] Inventors: Subhash C. Narang, Redwood City; Susanna C. Ventura, Los Alto, both of Calif.

[73] Assignee: SRI International, Menlo Park, Calif.

[ * ] Notice: This patent is subject to a terminal disclaimer.

[21] Appl. No.: 08/698,431

[22] Filed: Aug. 15, 1996

Related U.S. Application Data

[62] Division of application No. 08/372,216, Jan. 13, 1995, Pat. No. 5,548,055.

[51] Int. Cl.$^6$ .................................................. C08G 77/06
[52] U.S. Cl. .............................. 528/14; 528/25; 528/30; 528/417; 528/419; 528/421; 526/287
[58] Field of Search ................................ 528/25, 30, 14, 528/417, 419, 421; 526/287

[56] References Cited

U.S. PATENT DOCUMENTS

| | | |
|---|---|---|
| 3,412,129 | 11/1968 | Holdstock . |
| 3,655,712 | 4/1972 | Rossny . |
| 3,948,963 | 4/1976 | Rossny . |
| 4,012,303 | 3/1977 | D'Agostino et al. . |
| 4,151,149 | 4/1979 | Smith ...................................... 526/287 |
| 4,288,427 | 9/1981 | Farmer, III et al. ...................... 526/287 |
| 4,818,644 | 4/1989 | Armand . |
| 4,906,537 | 3/1990 | Hotomi et al. . |
| 5,061,581 | 10/1991 | Narang et al. . |
| 5,096,561 | 3/1992 | Akhtar . |
| 5,102,751 | 4/1992 | Narang et al. . |
| 5,153,080 | 10/1992 | Inubushi et al. . |
| 5,183,716 | 2/1993 | Nakacho et al. . |
| 5,219,679 | 6/1993 | Abraham et al. . |
| 5,223,353 | 6/1993 | Ohsawa et al. . |
| 5,235,017 | 8/1993 | O'Lenick, Jr. . |
| 5,283,310 | 2/1994 | Armand et al. . |
| 5,296,318 | 3/1994 | Gozdz et al. . |
| 5,316,871 | 5/1994 | Swathirajan et al. . |
| 5,357,025 | 10/1994 | Altes et al. . |
| 5,359,101 | 10/1994 | Woods et al. . |

OTHER PUBLICATIONS

Encyclopedia of Polymer Science and Engineering, vol. 15, pp. 234 and 235, John Wiley & Sons, NY (1989).
Armand et al., "Cationic Conductivity in POE Networks" *Seventh International Meeting on Lithium Batteries*), 375–377 (1994).
Bannister et al., "Ionic conductivities for poly(ethylene oxide) complexes with lithium salts of monobasic and dibasic acids and blends of poly(ethylene oxide) with lithium salts of anionic polymers" *Polymer* 25:1291–1296 (1984).
Bannister et al., "Ionic conductivities of poly(methoxy polyethylene glycol monomethacrylate) complexes with LiSO$_3$CH$_3$" *Polymer* 25:1600–1602 (1984).
Blonsky et al., "Polyphosphazene Solid Electrolytes" *J. Am. Chem. Soc.* 106:6854–6855 (1984).
Chen et al., "Cryptate Effects on Sodium–Conducting Phosphazene Polyelectrolyes" *Chem. of Materials* 1:483–484 (1984).
Ganapathiappan et al. "A New Class of Cation Conductors: Polyphosphazene Sulfonates" *Macromolecules* 21:2299–2301 (1988).
Ganapathiappan et al., "Synthesis, Characterization, and Electrical Response of Phosphazene Polyelectrolytes" *Journal of the American Chem. Soc.* 111:4091–4095 (1989).
Hardy et al., "Chloride Ion Conductivity in a Plasticized Quaternary Ammonium Polymer" *Macromolecules* 17:975–977 (1984).
Le Nest et al., "Cationic transport features of ionomeric polymer networks" *Polymer Communications* 28:302–305 (1987).
Narang et al., "Solid polymer electrolytes for rechargeable batteries. Final report," Report No. LBL–32059 (Department of Energy; Feb. 1992).
Narang et al., "Solid polymer electrolytes for rechargeable batteries. Final report," Report No. LBL–29829 (Department of Energy; Nov. 1990).
Rietman et al., "Single–Ion Conductivity in Comblike Polymers" *J. of Poly. Sci: Part C: Polymer Letters* 28:187–191 (1990).
Spindler et al., "Investigations of a Siloxane–Based Polymer Electrolyte Employing $^{13}$C, $^{29}$Si, $^7$Li, and $^{23}$Na Solid–State NMR Spectroscopy" *J. Am. Chem. Soc.* 110:3036–3043 (1988).
Tsuchida et al., "Single–Ion Conduction in Poly[(oligo(oxyethylene)methacrylate–co–(alkali–metal methacrylates)]" *Macromolecules* 88:96–100 (1988).
Tsuchida et al., "Conduction of Lithium Ions in Polyvinylidene Fluoride and its Derivatives—I" *Electrochemical Acta* 28(5):591–595 (1983).
Zhou et al., "Cation transport polymer electrolytes. Siloxane comb polymers with pendant oligo–oxyethylene chains and sulphonate groups" *Poly. Comm.* 30:52–55 (1989).

*Primary Examiner*—Melvyn I. Marquis
*Attorney, Agent, or Firm*—Robert Fish; Crockett & Fish

[57] ABSTRACT

A single-ion electrolyte achieves conductivity greater than 10$^{-3}$ S/cm at 20° C. by employing repeating mer units which are functionalized by fluoroalkylsulfonate groups. Preferred backbones for the electrolyte include polysiloxanes, polymethacrylates and poly(alkylene oxides). More preferred backbones have the structure

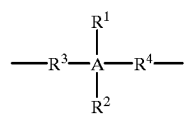

wherein A is selected from the group consisting of C and Si such that when A is C then R$^4$ is (CH$_2$)$_{1-100}$, and when A is Si then R$^4$ is O; R$^1$ and R$^2$ are independently selected from the group consisting of hydrogen, lower alkyl, lower alkoxy, fluorinated lower alkyl, fluorinated lower alkoxy, and fluoroalkylsulfonate; and R$^3$ is null or selected from the group consisting of O, (O)$_{1-100}$, O—CH$_2$, (O)$_{1-100}$—(CH$_2$)$_{1-100}$.

20 Claims, 1 Drawing Sheet

SINGLE-ION CONDUCTING SOLID POLYMER ELECTROLYTES, AND CONDUCTIVE COMPOSITIONS AND BATTERIES MADE THEREFROM

This application is a divisional of U.S. patent application Ser. No. 08/372,216, now U.S. Pat. No. 5,548,055, filed Jan. 13, 1995.

REFERENCE TO GOVERNMENT GRANT

This invention was made with Government support. The Government has certain rights in the invention.

TECHNICAL FIELD

The present invention relates generally to novel single-ion conducting polymer electrolytes. The invention additionally relates to conductive compositions containing these novel polymers in combination with one or more plasticizers. Also within the scope of the present invention are single-ion conducting gel electrolyte film compositions, and methods of manufacturing such compositions. The invention further relates to the use of these polymers and conductive compositions in solid-state batteries, fuel cells, sensors, supercapacitors, electrochromic devices and the like.

BACKGROUND OF THE INVENTION

A number of solvent-free polymer electrolytes are known and there has been considerable interest in the potential use of such electrolytes in electrochemical devices such as solid-state batteries, fuel cells, sensors, supercapacitors and electrochromic devices. Polymer electrolytes in general have a number of desirable features, i.e., they are inherently safe in operation, they avoid the leakage and drying problems experienced with liquid compositions, and they are further relatively processable. An additional advantage of solid polymer electrolytes is their ability to deform and thus maintain interfacial contact with electrodes.

Finally, polymer electrolytes may be cast in thin films to minimize resistance of the electrolyte and to reduce volume and weight.

Among the polymers which have been tested for use in solvent-free electrolyte systems are those based upon the linear-chain polyethers, poly(ethylene oxide) ("PEO") and poly(propylene oxide) ("PPO"), with associated alkali metal salts such as lithium salts. Representative PEO and PPO polymers are described by Le Nest et al., in *Polymer Communications* 28:302–305 (1987) and by Tsuchida et al., *Macromolecules* 88:96–100 (1988). However, such electrolytes display conductivity in the range of practical use (e.g., $\sigma=10^{-5}-10^{-3}$ S/cm) only at temperatures well above room temperature. Further, the reported linear-chain polyether electrolytes exhibit an ion transport number that is significantly lower than one, as both the anion and cation have ionic mobility and eventually account for the polymer electrolyte conductivity. Accordingly, a considerable amount of research has been focused on providing conductive solid polymer electrolytes capable of exhibiting conductivities in the range of their liquid electrolyte counterparts.

Attempts at improving the ionic conductivity of such polymer electrolytes have included the synthesis of new polymeric materials such as cation conductive phosphazene and siloxane polymers which exhibit better conductivity at room temperature than the linear-chain polyether electrolytes. In this regard, one class of polymers of interest are the polyphosphazene sulfonates as reported by Ganapathiappan et al. in both *Macromolecules* 21:2299–2301 (1988) and the *Journal of the American Chem. Soc.* 111:4091–4095 (1989); see also Chen et al., *Chem. of Materials* 1:483–484 (1984).

Other attempts at improving ionic conductivity have dealt with comb-like polymers with oligo-oxyethylene side chains anchored to a polyphospazene, polymethacrylate or polysiloxane backbone. See, e.g., Blonsky et al., *J. Am. Chem. Soc.* 106:6854–6855 (1984), Bannister et al., *Polymer* 25:1600–1602 (1984) and Spindler et al., *J. Am. Chem. Soc.* 110:3036–3043 (1988). Since the movement of ions through the polymer matrix proceeds essentially by a free volume mechanism, polymers with flexible side chains are generally preferred. Cation transport polymer electrolytes based on cation conductive siloxane comb polymers are reported by Zhou et al., *Poly. Comm.* 30:52–55 (1989) and by Rietman et al., *J. of Poly. Sci: Part C: Polymer Letters* 28:187–191 (1990). Solid polymer electrolytes having anionic conductivity have been reported as well, see, e.g., Miyanishi et al., *Macromolecules* 17:975–977 (1984).

In solid electrolytic systems, single-ion conductive polymers provide a distinct advantage over dual-ion conductive polymers (wherein both the anion and cation have mobility in the electrolyte) in that they can charge and discharge more completely (in part because DC polarization does not occur). More particularly, single-ion conducting polymer electrolytes have the capability of exclusively transporting cations, such as lithium, thereby minimizing polarization effects at the electrodes. Further, single-ion conducting electrolytes avoid the condition wherein both the dissociated cation and anion of the metal salt dissolve in the electrolyte and move toward the positive and negative electrodes at the same time, reducing the ion transportation value.

A number of single-ion conducting electrolytes have been reported. Poly(ethylene oxide)-polyelectrolyte blends—consisting of PEO mixed with an acrylate polymer having pendant sulfonate or perfluorocarboxylate groups—have been described which exhibit a lithium ion transference number close to unity. See, e.g., Bannister et al., *Polymer* 25:1291–1296 (1984). A single-ion conducting solid polymer electrolyte system comprising a solid solution having ionic species dissolved therein has also been described in U.S. Pat. No. 5,102,751 to Narang et al., the disclosure of which is incorporated herein by reference. Further, a single-ion conducting polymer consisting of short PEO units functionalized by N-(fluoroalkylsulfonate)amido has been reported. See, e.g., Armand et al., (*Seventh International Meeting on Lithium Batteries*), May 15–20, 1994. However, each of the above-described single-ion conducting polymer systems generally exhibit low conductivity (e.g., $\sigma<10^{-5}$ S/cm at 100° C.) as well as low electrochemical stability.

Accordingly, while the various solid polymer electrolytes set forth in the above publications have shown promise, those materials have limitations which prevent them from practical use in, for example, high energy-rechargeable batteries and other applications in which high ionic conductivity is necessary and wherein relatively thin films of the polymer electrolyte must be prepared. As noted above, prior polymer electrolytes do not exhibit sufficient ionic conductivity, particularly at room temperature. Further, such prior polymer electrolytes have generally not exhibited desirable physical properties for incorporation in electrolytic devices where, frequently, thin films of these electrolytes are necessary. For example, physical limitations inherent in those polymers include polymer films which may be too sticky, the polymers may be too close to being liquid, the polymers may be too brittle, or the polymers may be too heat sensitive.

One approach to overcoming some of the above-noted problems (i.e., brittleness, low ionic conductivity, and the like) with prior polymer electrolytes has been the combination of those electrolytes with liquid electrolytes that serve as plasticizers. In this manner, a number of plasticizers have been found to be useful in enhancing the ionic conductivity of solid polymer electrolytes. See, e.g., U.S. Pat. 5,102,751 to Narang et al., incorporated by reference above. Additionally, gel electrolytes containing poly(vinylidene fluoride) ("PVdF") have been developed, although such polymer electrolytes generally contain conventional lithium salts which are known to behave as dual-ion conductors, reducing the cation transport values obtainable from such systems. Further, gel electrolytes containing plasticizers have been reported (see, e.g., Tsuchida et al., *Electrochemical Acta* 28(5):591–595 (1983)); however, such electrolytes have been found to exhibit insufficiently high conductivity at room temperature. The use of PVdF copolymers to prepare gel electrolytes containing lithium salts has also been described by Gozdz et al. in U.S. Pat. No. 5,296,318; however, that method did not enable preparation of homogeneous, physically strong gel electrolyte films without phasic separation of the lithium salt.

Accordingly, although some prior plasticizers have been shown to improve conductivity in solid electrolyte polymers, those compositions still suffer from serious drawbacks. In particular, prior plasticizers have been found to be too volatile, causing them to separate from the polymer electrolyte composition over a period of time. Such separation results in a decrease in the conductivity, and further, the physical properties of the polymer will likewise change; for example, the polymer might become more brittle and/or might peel from a substrate on which it has been coated.

Other prior liquid electrolytes and plasticizers, such as propylene carbonate, are known to be reduced at the lithium anode or carbon anode of lithium batteries, therefore limiting battery performance. See, e.g., Arakawa et al., *J. Electroanal. Chem.* 219:273–280 (1987) and Shu et al., *J. Electrochem. Soc.* 140(4):922–927 (1993). The extent of propylene carbonate reduction is particularly severe on graphite electrodes. Although crown ethers have been used as additives in batteries to minimize such propylene carbonate reduction at the anode (see, e.g., Shu et al., *J. Electrochem. Soc.* 140(6):L101–L103 (1993) and U.S. Pat. No. 5,130,211 to Wilkinson et al.), high concentrations (0.3–0.5M) of crown ether are needed to adequately minimize electrolyte reduction. In this regard, since crown ethers are highly toxic and generally quite expensive, they are not expected to be of practical use in batteries.

Accordingly, there remains a need to provide single-ion conductive solid polymer electrolytes capable of exhibiting conductivities in the range of their liquid electrolyte counterparts at room temperature (e.g., in the range of $\sigma > 10^{-3}$ S/cm at 20° C.) as well as enhanced electrochemical stability. Additionally, there has remained a need to develop plasticizers for use with such polymer electrolytes that are capable of providing a plasticizing effect while also significantly enhancing the ionic conductivity of the solid polymer. Such plasticizers should not exhibit the drawbacks experienced by prior systems such as being readily volatilized away from the polymer and/or deleteriously altering the mechanical properties of the polymer.

SUMMARY OF THE INVENTION

In accordance with an embodiment of the present invention, solid polymer electrolytes are set forth having single-ion cationic conductivity and exhibiting enhanced ambient temperature ionic conductivity. The single-ion conducting polymers as described herein include polysiloxanes, partially fluorinated polymethacrylates and poly(alkylene oxide) solid polymer electrolytes ("SPEs") which are covalently functionalized by fluoroalkylsulfonate groups.

In one embodiment of the invention, single-ion conducting polymers are provided having the structure

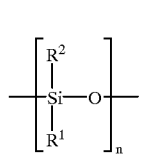

(I)

wherein:
$R^1$ and $R^2$ are individually selected from the group consisting of moieties having the structure

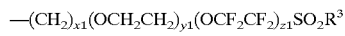

in which $R^3$ is —OM, —N(M)SO$_2$CF$_3$ or —C(M)(SO$_2$CF$_3$)$_2$ and M is an alkali metal, or wherein one of $R^1$ and $R^2$ has the structure

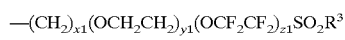

and the other is selected from the group consisting of hydrogen, lower alkyl, fluorinated lower alkyl, lower alkenyl, fluorinated lower alkenyl, aryl and aralkylene;

x1 and z1 may be the same or different and are integers in the range of 1 to 100 inclusive;

y1 is an integer in the range of 0 to 100 inclusive; and n is an integer indicating the number of mer units in the polymer.

In another embodiment of the invention, single-ion conducting co-polymers are provided which contain first mer units having the structure

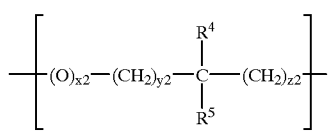

(II)

and second mer units having the structure

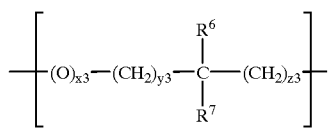

(III)

wherein:
$R^4$ and $R^6$ are independently selected from the group consisting of hydrogen, lower alkyl, lower alkoxy, —COOR$^8$ and —(CH$_2$)$_{n1}$—O—R$^8$ in which R$^8$ is lower alkyl or fluorinated lower alkyl and n1 is an integer in the range of 1 to 6 inclusive;

$R^5$ is —(CH$_2$)$_{x4}$(OCH$_2$CH$_2$)$_{y4}$(OCF$_2$CF$_2$)$_{z4}$SO$_3$M in which M is an alkali metal;

$R^7$ is —(CH$_2$)$_{x5}$(OCH$_2$CH$_2$)$_{y5}$OCH$_3$ or —COOR$^9$ in which R$^9$ is lower alkyl or fluorinated lower alkyl; and x2, x3, x4, x5, y2, y3, y4, y5, z2, z3 and z4 may be the same or different and are integers in the range of 1 to 100 inclusive.

In a further embodiment of the present invention, conductive compositions having enhanced ambient temperature conductivity are provided, where those compositions are formed from a combination of a single-ion conducting SPE according to the present invention, and an amount of a plasticizer effective to enhance the ionic conductivity of the associated polymer. More particularly, conductive compositions containing the single-ion conducting polymers of the present invention as described above in combination with suitable medium-boiling solvents or liquid electrolytes are disclosed herein which exhibit high ambient temperature ionic conductivities and excellent physical and mechanical attributes such as high flexibility, strength and electrochemical stability. Suitable plasticizers generally feature a high dielectric constant, a medium to high boiling point, and a low viscosity.

Plasticizers which are specifically contemplated for use herein include medium-boiling solvents such as ethylene carbonate ("EC"), propylene carbonate ("PC") and combinations thereof such as a 1:1 mixture by weight of PC:EC. Other medium-boiling organic solvents which are contemplated for use as plasticizers herein include other lower alkyl carbonates such as dimethyl carbonate, diethyl carbonate and dipropyl carbonate, and glymes (e.g., dimethoxyethane ($C_4H_{10}O_2$ or "DME"), diglyme ($C_6H_{14}O_3$), triglyme ($C_8H_{18}O_4$), tetraglyme ($C_{10}H_{22}O_5$) and so on); either alone or in combination. Cyclic carbonates may also be used as plasticizers in combination with the present polymers, e.g., functionalized cyclic ethers having the general structure

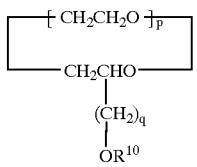

wherein:
$R^{10}$ is alkyl, —$(OC_2R^{11}_4)_m$—$R^{12}$ or —$(CO)OR^{13}$;
$R^{11}$ is independently selected from the group consisting of H, alkyl, aryl, alkenyl, fluoro, or fluorinated alkyl;
$R^{12}$ is H, alkyl or —$(OC_2R^{11}_4)_m$—$R^{13}$;
$R^{13}$ is H or alkyl;
p is an integer in the range of 1 to 5 inclusive; and
q is an integer in the range of 0 to 6 inclusive.

Still other plasticizers contemplated for use herein are described in co-pending U.S. patent application Ser. No. 08/372,216, entitled "ORGANIC LIQUID ELECTROLYTES AND PLASTICIZERS" inventors Ventura et al., filed Jan. 13, 1995, now U.S. Pat. No. 5,548,055 and incorporated herein by reference.

In yet a further embodiment of the present invention, single-ion conducting gel electrolyte film compositions are provided wherein those films are generally formed from a combination of a single-ion conducting SPE as described above with a plasticizer and a suitable amount of poly (vinylidene fluoride) for enhancing the mechanical strength of the resulting gel electrolyte composition. In this manner, the single-ion conducting SPEs of the present invention exhibit desirable physico-mechanical properties in that they may be formulated in thin but nevertheless highly conducting films having desirable physical properties such as enhanced mechanical strength and lack of stickiness.

According to the invention, there is further described a method of manufacturing single-ion conducting electrolyte films and other conductive compositions. Generally, such a method will involve a hot press technique for forming films; however, depending on the amounts of various components incorporated into the compositions, waxes and gels may be prepared as well.

In still another embodiment of the present invention, the SPEs may be used in the formulation of solid-state electrochemical devices such as fuel cells, supercapacitors, electrochromic devices and sensors, or in a battery such as in a solid state lithium battery or the like. In this regard, a solid-state battery comprising a positive electrode, a negative electrode and a single-ion conducting solid polymer electrolyte as described above is disclosed herein.

In yet a further embodiment of the invention, the presently described SPEs may be used in combination with plasticizers to form thin film SPEs; and, optionally, PVdF or an alternative material may be added in order to improve the SPE film mechanical strength. Accordingly, also provided herein are solid-state batteries comprising a positive electrode, a negative electrode and a single-ion conducting polymer electrolyte film according to the invention. With the subject SPE films, solid-state batteries such as a $Li_xC_6$/SPE/ $LiCoO_2$ battery may be fabricated having enhanced conductivity and rechargability.

DETAILED DESCRIPTION OF THE INVENTION

Figure 1:
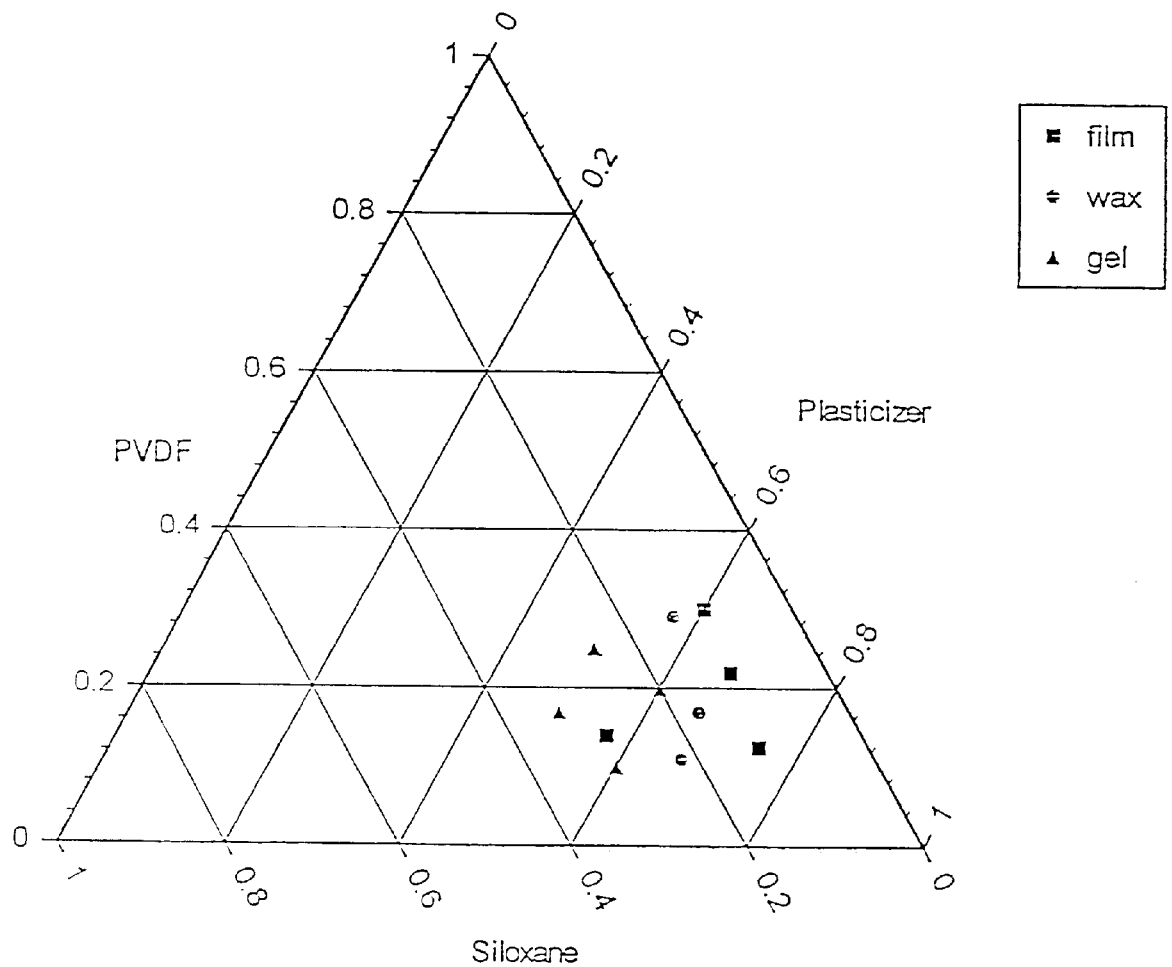
FIG. 1 is a diagram illustrating ranges of components in a composition containing a single-ion conducting polymer electrolyte, a plasticizer, and PVdF, for forming films, waxes and gels.

Definitions:

Before describing the present invention in detail, it is to be understood that this invention is not limited to particular salts, methods of synthesis, solvents, or the like, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the content clearly dictates otherwise. Thus, for example, reference to "a plasticizer" includes mixtures of plasticizers, and the like.

In this specification and in the claims which follow, reference will be made to a number of terms which shall be defined to have the following meanings:

The term "polymer" is intended to include both oligomeric and polymeric species, i.e., compounds which include two or more monomeric units, which may be a homopolymer or a copolymer. When a single generic structure is shown, e.g., as in formula (I), it is to be understood that the polymers described may contain two or more different monomeric units represented by the single generic structure. A "conductive polymer" is one which possesses conducting as opposed to insulating electrical-transport properties.

The term "homopolymer" intends a polymer incorporating a single species of monomer units. By contrast, the term "copolymer" refers to a polymer constructed from two or more chemically distinct species of monomer units in the same polymer chain. A "block copolymer" is a polymer which incorporates two or more segments of two or more distinct species of homopolymers or copolymers.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" intends an alkyl group of one to six carbon atoms. The term "fluorinated lower alkyl" intends an alkyl group of one to six carbon atoms in which at least one hydrogen atom, and optionally all hydrogen atoms, are replaced with fluorine atoms.

The term "alkenyl" refers to a branched or unbranched hydrocarbon chain containing from 2 to 24 carbon atoms and at least one double bond. "Lower alkenyl" refers to an alkenyl group of 2 to 6, more preferably 2 to 5, carbon atoms. The term "fluorinated lower alkenyl" intends an alkenyl group of one to six carbon atoms in which at least one hydrogen atom, and optionally all hydrogen atoms, are replaced with fluorine atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing one to six, more preferably one to four, carbon atoms.

The term "aryl" as used herein refers to a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents or the like.

The term "aralkylene" is used to refer to moieties containing both alkylene and monocyclic aryl species, typically containing less than about 12 carbon atoms in the alkylene portion, and wherein the aryl substituent is bound to the structure of interest through an alkylene linking group. Exemplary aralkylene groups have the structure —$(CH_2)_j$—Ar wherein j is an integer in the range of 1 to 6.

"Halo" or "halogen" refers to fluoro, chloro, bromo or iodo, and usually relates to halo substitution for a hydrogen atom in an organic compound. Of the halos, fluoro is typically preferred.

"Optional" or "optionally" means that the subsequently described circumstance may or may not occur, and that the description includes instances where said circumstance occurs and instances where it does not. For example, the phrase "optional covalent bond" means that a covalent bond may or may not be present and that the description includes both the instance when the covalent bond is present and the instance when the covalent bond is not present.

The Novel Compounds:

In one embodiment of the invention, there are provided a number of polysiloxane single-ion conducting solid polymer electrolytes covalently functionalized by fluoroalkylsulfonate groups. More particularly, there are provided polysiloxane SPEs having the general structure as shown in Formula I

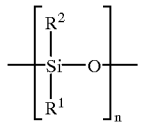

(I)

wherein:

$R^1$ and $R^2$ are individually selected from the group consisting of moieties having the structure

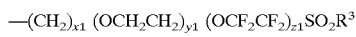

in which $R^3$ is OM, —$N(M)SO_2CF_3$ or —$C(M)(SO_2CF_3)_2$ and M is an alkali metal, or wherein one of $R^1$ and $R^2$ has the structure

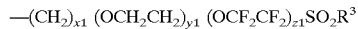

and the other is selected from the group consisting of hydrogen, lower alkyl, fluorinated lower alkyl, lower alkenyl, fluorinated lower alkenyl, aryl and aralkylene;

x1 and z1 may be the same or different and are integers in the range of 1 to 100 inclusive;

y1 is an integer in the range of 0 to 100 inclusive; and n is an integer indicating the number of mer units in the polymer, generally although not necessarily providing the polymer with a (weight average) molecular weight in the range of about 10,000 to 3,000,000, more typically in the range of about 100,000 to 1,000,000.

In preferred polysiloxane SPEs having the structure shown in Formula I, M is lithium.

In one group of particularly preferred polysiloxane SPEs having the structure of Formula I, $R^1$ and $R^2$ are the same moiety having the structure

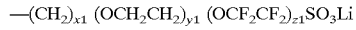

in which x1 and z1 may be the same or different and are integers in the range of 1 to 100 inclusive, and y1 is an integer in the range of 0 to 100 inclusive;

In another group of particularly preferred SPEs encompassed by Formula I, $R^1$ is a moiety having the structure

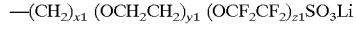

in which x1, y1 and z1 are as defined above, and $R^2$ is selected from the group consisting of hydrogen, lower alkyl, fluorinated lower alkyl, lower alkenyl, fluorinated lower alkenyl, aryl and aralkylene.

In still another group of particularly preferred SPEs having the structure of Formula I, $R^1$ and $R^2$ are the same moiety having the structure

in which x1, y1 and z1 are as defined above.

Additional particularly preferred SPEs of Formula I are wherein $R^1$ is a moiety having the structure

$R^2$ is selected from the group consisting of hydrogen, lower alkyl, fluorinated lower alkyl, lower alkenyl, fluorinated lower alkenyl, aryl and aralkylene, and x1, y1 and z1 are as defined above.

Still other particularly preferred SPEs having the structure of Formula I are wherein $R^1$ and $R^2$ are the same moiety having the structure

in which x1, y1 and z1, again, are as defined above.

Yet an additional group of particularly preferred SPEs according to Formula I are those wherein $R^1$ is a moiety having the structure

$R^2$ is selected from the group consisting of hydrogen, lower alkyl, fluorinated lower alkyl, lower alkenyl, fluorinated lower alkenyl, aryl and aralkylene, and x1, y1 and z1 are as defined earlier.

In additional to the polysiloxane family of SPEs provided herein, i.e., those polymers having the structure of Formula I, a number of polymethacrylates and poly(alkene oxides) covalently functionalized by fluoroalkylsulfonate groups have been found to be useful as well. More particularly, there are provided a number of copolymeric SPEs containing first mer units having the structure (II)

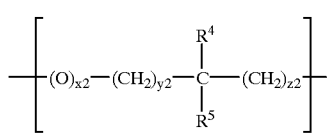

(II)

and second mer units having the structure (III)

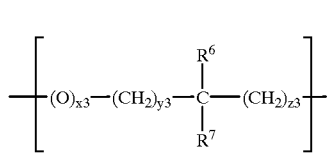

(III)

wherein:

$R^4$ and $R^6$ are independently selected from the group consisting of hydrogen, lower alkyl, lower alkoxy, —$COOR^8$ and —$(CH_2)_{n1}$—O—$R^8$ in which $R^8$ is lower alkyl or fluorinated lower alkyl and n1 is an integer in the range of 1 to 6 inclusive;

$R^5$ is —$(CH_2)_{x4}(OCH_2CH_2)_{y4}(OCF_2CF_2)_{z4}SO_3M$ in which M is an alkali metal;

$R^7$ is —$(CH_2)_{x5}(OCH_2CH_2)_{y5}OCH_3$ or —$COOR^9$ in which $R^9$ is lower alkyl or fluorinated lower alkyl; and x2, x3, x4, x5, y2, y3, y4, y5, z2, z3 and z4 may be the same or different and are integers in the range of 1 to 100 inclusive.

As with the polymers of Formula I, preferred copolymers containing mer units (II) and (III) are wherein M is lithium. Also, these copolymers will generally have a (weight average) molecular weight in the range of about 10,000 to 3,000,000, more typically in the range of about 100,000 to 1,000,000.

A number of preferred copolymers useful as SPEs may be identified. A first group of such copolymers are wherein $R^4$ and $R^6$ are hydrogen or lower alkyl, and $R^7$ is —$(CH_2)_{x4}(OCH_2CH_2)_{y4}OCH_3$, with x4 and y4 defined as above.

Another group of particularly preferred copolymers useful as SPEs are wherein $R^4$ and $R^7$ are independently —$COOR^8$ and $R^6$ is hydrogen or lower alkyl.

The polymers of the invention may be prepared using conventional techniques well-known to those skilled in the art of synthetic organic chemistry or which may be found in the relevant texts such as in Kirk-Othmer's *Encyclopedia of Chemical Technology,* in House's *Modern Synthetic Reactions,* in C. S. Marvel and G. S. Hiers' text, *ORGANIC SYNTHESIS,* Collective Volume 1, or the like. Synthesis of representative polymers is exemplified below.

Manufacturing Methods:

A preferred method of manufacturing conductive compositions containing the novel electrolytes is a hot-press technique for forming films. Such a method typically involves: (a) forming a gel electrolyte composition by combining (i) a single-ion conducting SPE of the invention (i.e., a polysiloxane of Formula (I) or a copolymer containing mer units (II) and (III)), with (ii) an effective amount of plasticizer for enhancing the ionic conductivity of that SPE and (iii) an amount of PVdF or an alternative material effective to enhance the mechanical strength of the composition; (b) heating the resulting combination at a temperature and for a time effective to form a fluid solution; (c) pressing the fluid solution; (d) cooling the solution; and (e) releasing the film so provided.

If waxes or gels are preferred, rather than films, the relative quantities of components can be adjusted to provide these alternative forms of conductive compositions. Reference may be had to FIG. 1, in which it may be seen that compositions containing less electrolyte will generally form a gel, compositions containing slightly more electrolyte will generally form a wax, and compositions containing even more electrolyte will form a film. Alternative methods of manufacturing such conductive compositions will be readily apparent to those skilled in the art, or may be deduced from the relevant literature.

Industrial Applicability:

Conductive compositions formulated with the novel single-ion conducting solid polymer electrolytes are useful in a variety of contexts. An important utility is in the fabrication of batteries. Solid-state batteries formulated with the novel electrolyte polymers comprise a positive electrode, or anode, a negative electrode, or cathode, and the single-ion conducting polymer electrolyte. The anode is usually a carbon-based material such as petroleum coke or graphite. Alternatively, lithium metal may be used as the anode, or intercalating metal oxides such as tungsten or iron oxides. The cathode is generally of a lithium-containing material such as $LiCoO_2$, $LiMn_2O_4$ or $LiNiO_2$; however, alternative materials could be used as well, e.g., $V_6O_{13}$.

It will be appreciated that conductive compositions formulated with the novel electrolyte materials of the invention are also useful in the fabrication of fuel cells, sensors, supercapacitors, electrochromic devices, and the like, using manufacturing techniques well known to those skilled in the art, or readily available in the relevant literature.

The following examples are intended to provide those of ordinary skill in the art with a complete disclosure and description of how to make and use the materials of the invention, and are not intended to limit the scope of what the inventors regard as their invention in any way. Efforts have been made to ensure accuracy with respect to numbers used (e.g., amounts, temperatures, etc.), but some experimental error and deviation should, of course, be allowed for. Unless indicated otherwise, parts are parts by weight, temperatures are in degrees centigrade, and pressure is at or near atmospheric.

Experimental

Equipment and Measurement Techniques:

Conductivities of the polymers were evaluated by AC impedance spectroscopy. In this regard, a film of the dried polymer electrolyte was sandwiched between two stainless steel blocking electrodes, each having an area of 0.7854 $cm^2$. The thickness of the polymer film, which typically varied between 0.51 mm and 1.02 mm, was measured with a micrometer. An assembly, composed of a blocking electrode-polymer sandwich cell inside a Delrin cup, was transferred to a vacuum chamber that had provision for heating and applying a constant pressure of 65–97 $lb/in_2$ across the polymer film. Electrodes were connected to a potentiostat (PAR 173) operating in the galvanostatic mode.

The cell was then perturbed with a small AC signal generated by a Solartron 1250 Frequency Response Analyzer, and the real and imaginary components of the cell impedance were measured as a function of frequency at each of the desired temperatures. The setup was allowed to stabilize overnight after the temperature was changed. The AC impedance data were plotted in both the Nyquist and Bode planes to identify the high frequency relaxation arising due to the polymer electrolyte. Typically, the frequency of the AC signal was scanned from 65 KHz down to 10 mHz. The intercept at the real axis of the high frequency relaxation was assumed to represent the resistive component of the polymer electrolyte impedance. This was then converted to the resistivity of the polymer (the thickness and the area of the polymer films were known). The reciprocal of resistivity gave the conductivity, a, having units of $\Omega cm^{-1}$. In cases where high frequency relaxation occurred above 65 KHz, a Hewlett-Packard 4192A Impedance Analyzer was used to measure the polymer electrolyte resistance. This instrument has a frequency range capability of 13 MHz to 5 Hz.

Preparation of Polymer Films:

Solutions of polymer films were prepared by dissolving a known quantity of polymer in dry solvent. For conductivity measurements, the polymer solution was added dropwise into the Delrin cup to cast a film. The film was then dried for 3 days in a glass vacuum apparatus at 120° C. at <0.01 torr. Film thickness was measured using a micrometer.

EXAMPLE 1

Preparation of Polymethylsiloxane with $C_3H_6C_2F_4SO_3Li$ Pendant Group

Polymethylsiloxane carrying a $C_3H_6OC_2F_4SO_3Li$ pendant group was synthesized as according to the following scheme and procedures:

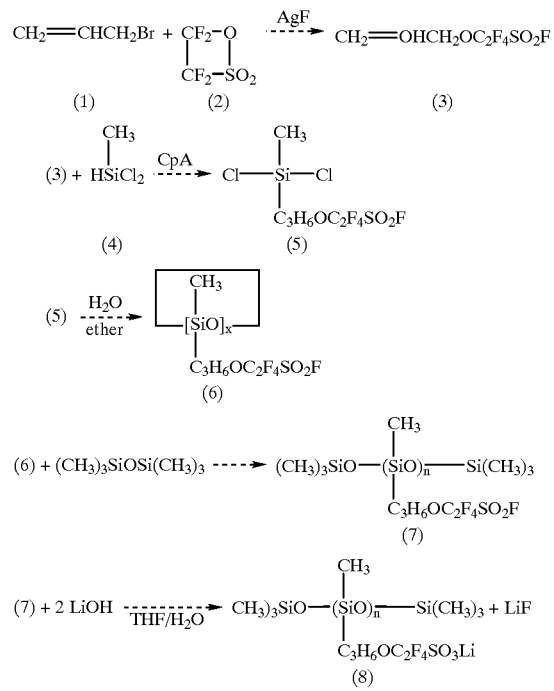

(a.) Preparation of Fluorosultone (2):

In a 500-ml Parr pressure reactor equipped with a magnetic stirrer, 50 ml of fresh sulfur trioxide was prepared by distillation of fuming sulfuric acid. Under stirring, tetrafluoroethylene was introduced continuously at the pressure of 30 psi. Exothermic reaction took place. The volume of the liquid content increased gradually as the reaction proceeded. At the end of the reaction, the crude product was purified by distillation. A colorless liquid product was collected at the temperature of 42–43° C. 162.9 g fluorosultone (2) was obtained.

(b.) Preparation of (3):

In a 250-ml 3-neck flask equipped with a magnetic stirrer and covered with aluminum foil, 63.44 g (0.50 mol) of silver fluoride and 100 ml of anhydrous diglyme were combined. The flask was cooled to –78° C. and 90.04 g (0.50 mol) of fluorosultone (2) was added dropwise. A clear solution was produced after 1 hr at room temperature. The flask was again cooled to –78° C. and 60.49 g (0.50 mol) of allyl bromide (1) was added dropwise. The reaction was heated at 45–50° C. for 16 hours. The mixture was then filtered to remove AgBr. The filtrate was poured into 100 ml water and the oily layer which formed was washed three times with water and dried over $Mgso_4$. Distillation gave 79.16 g (3), 76.1%, bp 120–121° C. The identity of the product was confirmed using $^1H$ NMR spectroscopy ($^1H$ NMR (CDCl/δ): 4.60 (d, 2H, $CH_2$=$CHCH_2O$—); 5.34–5.47 (m, 2H, $CH_2$=CH—); 5.89–5.98 (m, 1H, $CH_2$=$CHCH_2O$—)).

(c.) Preparation of (5):

In a high pressure reactor, 72.69 g (0.35 mol) of (3), 80.53 g (0.70 mol) dichloromethylsilane (4) and 0.46 g (1.1 mol) catalyst chloroplatinic acid were combined. The reactor was sealed and filled with argon to a pressure of 50 psi and then heated at 70–90° C. for 22 hrs. After cooling to room temperature, the product was then transferred under inert atmosphere to a flask using a double-tip needle. Un-reacted dichloromethylsilane was removed under reduced pressure. Distillation gave 85.89 g (5), 76%, bp 68–71° C./0.80 mm Hg. The identity of the product was confirmed using $^1H$ NMR spectroscopy ($^1H$ NMR (CDCl$_3$/δ): 0.82 (s, 3H, $CH_3Si$—); 1.15–1.25 (m, 2H, $SiCH_2CH_2CH_2$—); 1.9–2.0 (m, 2H, $SiCH_2CH_2CH_2$—); 4.1–4.2 (t, 2H, $SiCH_2CH_2CH_2OC_2F_4SO_2F$)).

(d.) Preparation of (6):

(5) (85.8 g, 0.27 mol) was taken up in anhydrous ether (50 mL), and the resultant solution was then added to a mixture of water (50 mL) and ether (50 mL) dropwise under stirring. At the end of the addition, the reaction was allowed to continue overnight. The oily layer was separated from the aqueous layer. The aqueous layer was then extracted with ether (40 mL×3), and the ether extract was combined with the oily layer product, washed with water until the water phase became neutral to pH paper, dried over anhydrous $MgSo_4$, filtered, and the solvent was removed from the filtrate by rotary evaporator. The resulting colorless liquid residue was further dried at room temperature under 0.1 torr vacuum for 4 hours to yield 70.68 g. cyclosiloxane (6) (99%). The identity of the intermediate (6) was confirmed using $^1H$ NMR spectroscopy ($^1H$ NMR (CDCl$_3$/δ): 0.05–0.08 (m, 3H, $CH_3Si$—); 0.25–0.35 (m, 2H, $SiCH_2CH_2CH_2$—); 1.85–1.90 (broad, 2H, $SiCH_2CH_2O$—); 4.0–4.5 (broad, 2H, $SiCH_2CH_2O$)).

(e.) Preparation of (7):

The cyclosiloxane (6) (350 g, 1.305 mol) and hexamethyldisiloxane (42.4 g, 0.261 mol) were added to a round bottom flask with 10 drops of concentrated sulfuric acid and allowed to sit overnight. An additional 10 drops of concentrated sulfuric acid were then added and the mixture was stirred for 24 hours. The mixture was then taken in methylene chloride and washed with water (2×500 mL) and then a saturated solution of NaCl containing a small amount of $NaHCO_3$. The solution was dried over $MgSO_4$ before removing the solvent by evaporation.

(f.) Preparation of (8):

The sulfonyl fluoride polysiloxane (7) (59.80 g, 0.22 mol) was taken up in 270 mL THF. To the THF solution, lithium hydroxide aqueous solution (10.67 g of anhydrous LiOH, 0.44 mol, in 150 mL water) was added dropwise in 6 hours. Theoretically, two moles of lithium hydroxide are required to convert each sulfonyl fluoride group to lithium sulfonate. However, lithium hydroxide readily absorbs moisture because it is hygroscopic. A slight excess of LiOH was added until the solution became neutral using a pH meter as a monitor. The absence of $^{19}F$ NMR absorption at 123.5 ppm due to —$SO_2F$ confirmed that all of the sulfonyl fluoride groups were converted to lithium sulfonate. THF and water were then rotary evaporated off. The residual white solid was dried at 50° C. under 0.1 torr vacuum overnight.

The resulting crude product was dissolved in 200 mL acetone. The mixture was filtered in order to remove LiF, and the filtrate was then concentrated. The concentrated acetone solution was added dropwise to 600 mL of dry ether under stirring. The polymer product was precipitated out. The polymer product (8) was then dried at 70–80° C. under 0.05 torr vacuum for 2 days, and the pure product (8) was obtained in 93% yield. The identity of the product (8) was confirmed using $^1H$ NMR spectroscopy ($^1H$ NMR ($D_2O/\delta$): 0.21 (broad, 3H, $CH_3Si$—); 0.70 (broad, 2H, $SiCH_2CH_2CH_2$—); 1.80 (broad, 2H, $SiCH_2CH_2CH_2$—); 4.10 (broad, 2H, $SiCH_2CH_2CH_2OCF_2CF_4SO_3Li$); $^{19}F$ NMR ($D_2O$/ppm): -5.61 (s, —$CF_2CF_2SO_3Li$); —39.03 (s, —$CF_2CF_2SO_3Li$)).

EXAMPLE 2

A lithium triflate polysiloxane single-ion conducting polymer having the general structure

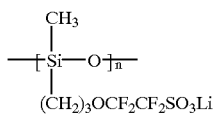

was synthesized using the method of the preceding example. The polymer was combined with various plasticizers, and the conductivity $\sigma(\Omega^{-1}cm^{-1})$ was determined using the method described above. The experimental results thus obtained are set forth in Table I.

TABLE I

| Plasticizer | Plasticizer Ratio | Ratio of Polymer: to Plasticizer | $\sigma\ (\Omega^{-1}\ cm^{-1})$ |
|---|---|---|---|
| 12-Crown-4 | — | 1:3 | 8.87 E$^{-5}$ |
| PC:EC | 1:1 | 1:3 | 2.99 E$^{-4}$ |
| PC:DME | 1:1 | 1:3 | 4.80 E$^{-4}$ |
| EC:DME | 1:1 | 1:3 | 7.51 E$^{-4}$ |
| EC:DME | 2:1 | 1:3 | 7.45 E$^{-4}$ |
| EC:MEE | 1:2 | 1:3 | 5.91 E$^{-4}$ |
| EC:MEE | 1:1 | 1:3 | 1.06 E$^{-3}$ |
| EC:MEE | 1:1 | 1:6 | 1.02 E$^{-3}$ |
| PC:DEC | 1:1 | 1:3 | 1.06 E$^{-4}$ |
| PC:DEC | 1:1 | 1:2 | 9.33 E$^{-5}$ |
| PC:EC:12-Crown-4 | 1:1:1 | 1:3 | 3.91 E$^{-4}$ |
| PC:EC:DEC | 1:1:2 | 1:3 | 3.04 E$^{-4}$ |
| DEC:EC:MEE | 1:1:2 | 1:3 | 6.94 E$^{-4}$ |
| PC:EC:DME | 1:1:2 | 1:2 | 6.34 E$^{-4}$ |
| PC:EC:DME | 1:1:2 | 1:2.5 | 8.71 E$^{-4}$ |
| PC:EC:DME | 1:1:2 | 1:3 | 1.07 E$^{-3}$ |
| PC:EC:MEE | 1:1:2 | 1:3 | 1.11 E$^{-3}$ |
| PC:EC:MEE | 1:1:2 | 1:3.5 | 5.24 E$^{-4}$ |
| PC:EC:MEE | 1:1:2 | 1:4 | 4.32 E$^{-4}$ |

In Table I, the abbreviations are as follows: PC, propylene carbonate; EC, ethylene carbonate; DME, dimethoxyethane; MEE, methoxyethoxy ethyl ether; and diethylene carbonate. It may be seen that high ambient temperature conductivity may be achieved and varied, if desired, by choosing different plasticizers and/or relative quantities of plasticizer and polymeric electrolyte in the conductive composition.

EXAMPLE 3

The polymers set forth in Table II were prepared by copolymerizing the corresponding monomeric species, and then combined with the plasticizers propylene carbonate, ethylene carbonate, and methoxyethoxy ethane and other materials as indicated in Table III. Conductivity data was determined and is set forth in Table III.

TABLE II

| NUMBER | SAMPLE |
|---|---|
| SPE1 | —$(CH_2$—$CH$—$O)_n$— <br> \| <br> $CH_2OC_2F_4SO_3Li$ |
| SPE2 | $CH_3$ <br> \| <br> —$(CH_2$—$C$—$CH_2$—$O)_n$— <br> \| <br> $CH_2OC_2F_4SO_3Li$ |
| SPE3 | —$(CH_2$—$CH)_{0.2}$ $(CH_2$—$CH$—$O)_{0.8}$— <br> \| \| <br> $CH_2OC_2H_4OC_2H_4OMe$ $CH_2OC_2F_4SO_3Li$ |
| SPE4 | —$(CH_2$—$CH)_{0.2}$ $(CH_2$—$CH$—$O)_{0.8}$— <br> \| \| <br> $CH_2OC_2H_4OC_2H_4OMe$ $CH_2SO_3Li$ |

TABLE II-continued

| NUMBER | SAMPLE |
|---|---|
| SPE5 | —(CH$_2$—CH)$_{0.5}$—(CH$_2$—CH—O)$_{0.5}$— <br>           CH$_2$O(C$_2$H$_4$O)$_{7.3}$Me     CH$_2$SO$_3$Li |
| SPE6 | —(CH$_2$—CH)$_{0.5}$—(CH$_2$—CH—O)$_{0.5}$— <br>           CH$_2$O(C$_2$H$_4$O)$_{7.3}$Me     CH$_2$OC$_2$F$_4$SO$_3$Li |
| SPE7 | CH$_2$OCF$_2$CF$_2$SO$_3$Li    CH$_3$ <br> —(CH$_2$—C)$_x$—(CH$_2$—C)$_y$— <br> CO$_2$CH$_2$CH$_3$        CO$_2$(CH$_2$)$_3$CH$_3$ |
| SPE8 | CH$_2$OCF$_2$CF$_2$SO$_3$Li    H <br> —(CH$_2$—C)$_x$—(CH$_2$—C)$_y$— <br> CO$_2$CH$_2$CH$_3$        CO$_2$CH$_3$ |
| SPE9 | CH$_3$              CH$_2$OCH$_2$CF$_3$ <br> —(CH$_2$—C)$_x$—(CH$_2$—C)$_y$— <br> CO$_2$CH$_2$CH$_2$OCF$_2$CF$_2$SO$_3$Li    CO$_2$CH$_2$CH$_3$ |
| SPE10 | CH$_3$              CH$_2$OCH$_2$CF$_2$CF$_2$CF$_3$ <br> —(CH$_2$—C)$_x$—(CH$_2$—C)$_y$— <br> CO$_2$CH$_2$CH$_2$OCF$_2$CF$_2$SO$_3$Li    CO$_2$CH$_2$CH$_3$ |
| SPE11 | CH$_3$        CH$_2$OCH$_2$CF$_3$    CH$_2$OCH$_2$CF$_2$CF$_2$CF$_3$ <br> —(CH$_2$—C)$_x$—(CH$_2$—C)$_y$—(CH$_2$—C)$_z$— <br> CO$_2$CH$_2$CH$_2$OCF$_2$CF$_2$SO$_3$Li   CO$_2$CH$_2$CH$_3$   CO$_2$CH$_2$CH$_3$ |
| SPE12 | CH$_3$              H <br> —(CH$_2$—C)$_x$—(CH$_2$—C)$_y$— <br> CO$_2$CH$_2$CH$_2$OCF$_2$CF$_2$SO$_3$Li    CH$_2$OCH$_2$CH$_2$OCF$_2$CF$_2$SO$_3$Li |
| SPE13 | CH$_3$              CH$_3$ <br> —(CH$_2$—C)$_x$—(CH$_2$—C)$_y$— <br> CO$_2$CH$_2$CH$_2$OCF$_2$CF$_2$SO$_3$Li    CO$_2$CH$_2$CF$_3$ |
| SPE14 | CH$_3$              H <br> —(CH$_2$—C)$_x$—(CH$_2$—C)$_y$— <br> CO$_2$CH$_2$CH$_2$OCF$_2$CF$_2$SO$_3$Li    CO$_2$CH$_2$(CF$_2$)$_6$CF$_3$ |
| SPE15 | CH$_2$OCF$_2$CF$_2$SO$_3$Li    CH$_2$OCH$_2$CF$_3$ <br> —(CH$_2$—C)$_x$—(CH$_2$—C)$_y$— <br> CO$_2$CH$_2$CH$_3$        CO$_2$CH$_2$CH$_3$ |
| SPE16 | CH$_2$OCF$_2$CF$_2$SO$_3$Li    CH$_2$OCH$_2$CF$_2$CF$_2$CF$_3$ <br> —(CH$_2$—C)$_x$—(CH$_2$—C)$_y$— <br> CO$_2$CH$_2$CH$_3$        CO$_2$CH$_2$CH$_3$ |

TABLE II-continued

| NUMBER | SAMPLE |
|---|---|
| SPE17 | —(CH$_2$—C)$_x$— with CH$_2$OCF$_2$CF$_2$SO$_3$Li and CO$_2$CH$_2$CH$_3$ ; —(CH$_2$—C)$_y$— with H and CH$_2$OCH$_2$CH$_2$OCF$_2$SO$_3$Li |
| SPE18 | —(CH$_2$—C)$_x$— with CH$_2$OCF$_2$CF$_2$SO$_3$Li and CO$_2$CH$_2$CH$_3$ ; —(CH$_2$—C)$_y$— with H and CO$_2$CH(CF$_3$)$_2$ |
| SPE19 | —(CH$_2$—C)$_x$— with CH$_2$OCF$_2$CF$_2$SO$_3$Li and CO$_2$CH$_2$CH$_3$ ; —(CH$_2$—C)$_y$— with CH$_3$ and CO$_2$CH$_2$CF$_3$ |
| SPE20 | —(CH$_2$—C)$_x$— with CH$_2$OCF$_2$CF$_2$SO$_3$Li and CO$_2$CH$_2$CH$_3$ ; —(CH$_2$—C)$_y$— with H and CO$_2$CH$_2$CF$_2$CF$_2$CF$_3$ |
| SPE21 | —(CH$_2$—C)$_x$— with CH$_2$OCF$_2$CF$_2$SO$_3$Li and CO$_2$CH$_2$CH$_3$ ; —(CH$_2$—C)$_y$— with H and CO$_2$CH$_2$(CF$_2$)$_6$CF$_3$ |

TABLE III

| EXP NO. | SAMPLE | PLASTICIZER | PLASTICIZER RATIO | RATIO OF POLYMER:PLASTICIZER | $\sigma$ ($\Omega^{-1}$ CM$^{-1}$) |
|---|---|---|---|---|---|
| 1 | SPE1 | PC:EC | 1:1 | 1:2 | $8.39 \times 10^{-5}$ |
| 2 | SPE1 | PC:EC | 1:1 | 1:3 | $1.62 \times 10^{-4}$ |
| 3 | SPE1 | EC:MEE | 1:1 | 1:3 | $4.47 \times 10^{-4}$ |
| 4 | SPE1 | EC:MEE | 1:1 | 1:4 | $8.08 \times 10^{-4}$ |
| 5 | SPE1 | EC:MEE | 1:1 | 1:4.5 | $7.57 \times 10^{-4}$ |
| 6 | SPE1 | PC:EC:MEE | 1:1:2 | 1:2 | $3.91 \times 10^{-4}$ |
| 7 | SPE1 | PC:EC:MEE | 1:1:2 | 1:3 | $4.49 \times 10^{-4}$ |
| 8 | SPE1 | PC:EC:MEE | 1:1:2 | 1:3.5 | $5.92 \times 10^{-4}$ |
| 9 | SPE1 | PC:EC:MEE | 1:1:2 | 1:4 | $7.36 \times 10^{-4}$ |
| 10 | SPE1 | PC:EC:MEE | 1:1:2 | 1:4.5 | $7.16 \times 10^{-4}$ |
| 11 | SPE1 | PC:EC:MEE | 1:1:2 | 1:5 | $6.62 \times 10^{-4}$ |
| 12 | SPE2 | PC:EC:MEE | 1:1:2 | 1:3 | $9.80 \times 10^{-5}$ (~50% soluble) |
| 13 | SPE3 |  | 1:1:2 | 1:3 | $4.22 \times 10^{-4}$ |
| 14 | SPE4 |  | 1:1:2 | 1:3 | insoluble |
| 15 | SPE5 |  | 1:1:2 | 1:3 | insoluble |
| 16 | SPE6 |  | 1:1:2 | 1:3 | $2.17 \times 10^{-4}$ |

| Copolymer | Copolymer Ratio | Copolymer PC/EC/MEE | $\sigma$ ($\Omega^{-1}$ CM$^{-1}$) | Li Density (Wt %) | AIBN (mole %) | Dioxane (Wt %) |
|---|---|---|---|---|---|---|
| SPE 7 | 75:25 | 1:3 | $4.14 \times 10^{-4}$ | 0.48 | 0.95 | 49 |
| SPE 8 | 75:25 | 1:3 | $5.87 \times 10^{-4}$ | 0.51 | 0.96 | 53 |
| SPE 9 | 50:50 | 1:3 | 4.55 E-4 | 0.33 | 1.76 | 50 |
| SPE 10 | 75:25 | 1:3 | 8.54 E-4 | 0.42 | 1.52 | 45 |
|  | 85:15 | 1:3 | $4.99 \times 10^{-4}$ | 0.48 | 1.05 | 36 |
| SPE 11 | 35:30:35 | 1:3 | 2.20 E-4 | 0.22 | 1.41 | 43 |
| SPE 12 | 50:50 | 1:3 | 4.85 E-4 | 0.59 | 0.80 | 41 |
| SPE 13 | 50:50 | 1:3 |  | 0.36 | 1.04 | 34 |
| SPE 14 | 50:50 |  |  | 0.23 | 1.00 | 36 |
| SPE 15 | 50:50 | 1:3 | 5.86 E-4 | 0.33 | 1.67 | 49 |
|  |  | 1:4 | 3.62 E-4 | 0.27 |  |  |
| SPE 16 | 50:50 | 1:3 | 2.68 E-4 | 0.28 | 2.07 | 49 |

TABLE III-continued

|      |       | 1:4 | 4.21 E-4       | 0.22 |      |    |
|------|-------|-----|----------------|------|------|----|
|      | 75:25 | 1:3 | 2.20 E-4       | 0.42 | 1.79 | 44 |
|      |       | 1:3 | 5.80 E-4 (w/LiF)|     |      |    |
|      |       |     |                | 0.53 |      | 0  |
|      | 75:25 (H.MW) | 1:3 | 4.67 E-4 |      |      |    |
|      | 85:15 | 1:3 | 5.12 E-4       | 0.48 | 1.89 | 46 |
| SPE 17 | 50:50 | 1:3 | 5.57 E-4     | 0.59 | 1.39 | 52 |
| SPE 18 | 50:50 | 1.3 | 5.01 E-4     | 0.32 | 1.54 | 46 |
| SPE 19 | 50:50 | 1.3 | 4.89 E-4     | 0.36 | 1.23 | 45 |
| SPE 20 | 50:50 | 1:3 | 2.56 E-4     | 0.31 | 1.00 | 34 |
| SPE 21 | 50:50 |     |                | 0.23 | 1.11 | 32 |

We claim:

1. A single-ion conducting polymer electrolyte having a plurality of repeating mer units functionalized by fluoroalkylsulfonate groups, the polymer having a conductivity greater than $10^{-3}$ S/cm at 20° C.

2. The electrolyte of claim 1 further comprising a polysiloxane.

3. The electrolyte of claim 1 further comprising a partially fluorinated polymethacrylate.

4. The electrolyte of claim 1 further comprising a poly(alkylene oxide).

5. The electrolyte of claim 1 wherein the mer units have the structure:

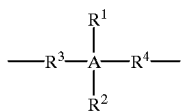

wherein;

A is selected from the group consisting of C and Si such that when A is C then $R^4$ is $(CH_2)_{1-100}$ and when A is Si then $R^4$ is O;

$R^1$ and $R^2$ are independently selected from the group consisting of hydrogen, lower alkyl, lower alkoxy, fluorinated lower alkyl, fluorinated lower alkoxy, and fluoroalkylsulfonate; except neither $R^1$ nor $R^2$ are a lower alkoxy or a fluorinated lower alkoxy when A is silicon; and $R^3$ is null or selected from the group consisting of O, $(O)_{1-100}$, $O-CH_2$, $(O)_{1-100}-(CH_2)_{1-100}$.

6. The electrolyte of claim 5 wherein at least one of $R^1$ and $R^2$ comprises —WXYZ, where W is $(CH_2)_{1-100}$;
X is $(OCH_2CH_2)_{0-100}$;
Y is $(OCF_2CF2)_{1-100}$;
Z is $SO_2OM$, $SO_2NMSO_2CF_3$, or $SO_2C(M)(SO_2CF_3)_2$; and
M is an alkali metal.

7. The electrolyte of claim 5 wherein in at least one of the mer units $R^1$ is $—COOL^1$ where $L^1$ is selected from the group consisting of lower alkyl and fluorinated lower alkyl.

8. The electrolyte of claim 5 wherein in at least one of the mer units $R^1$ is $—(CH_2)_{1-6}—O—L^1$ where $L^1$ is selected from the group consisting of lower alkyl and fluorinated lower alkyl.

9. The electrolyte of claim 5 wherein in at least one of the mer units $R^1$ is $—(CH_2)_{1-100}(OCH_2 CH_2)_{1-100}(OCF_2CF_2)_{1-100}SO_3M$ where M is an alkali metal.

10. The electrolyte of claim 5 wherein in at least one of the mer units $R^1$ is $—(CH_2)_{1-100}(OCH_2 CH_2)_{1-100}OCH_3$, $—COOL^1$ where $L^1$ is selected from the group consisting of lower alkyl and fluorinated lower alkyl.

11. A copolymer including at least one of the mer units according to claim 6 wherein $R^1$ is $—COOL^1$, and at least one of the mer units according to claim 6 wherein $R^1$ is $—(CH_2)_{1-6}—O—L^1$ where $L^1$ is selected from the group consisting of lower alkyl and fluorinated lower alkyl.

12. A copolymer including at least one of the mer units according to claim wherein $R^1$ is $—(CH_2)_{1-100}(OCH_2CH_2)_{1-100}(OCF_2CF_2)_{1-100}SO_3M$, and at least one of the mer units according to claim 6 wherein $R^1$ is $—(CH_2)_{1-100}(OCH_2CH_2)_{1-100}OCH_3$, $—COOL^1$.

13. The electrolyte of claim 5 wherein in at least one of the mer units $R^3$ is $(O)_{1-100}—(CH_2)_{1-100}$.

14. The electrolyte of claim 5 wherein in at least one of the mer units $R^3$ is $O—(CH2)_{1-100}$.

15. The electrolyte of claim 5 wherein in at least one of the mer units $R^3$ is $O—CH2$.

16. The electrolyte of claim 5 wherein in at least one of the mer units $R^3$ is O.

17. The electrolyte of claim 5 wherein in at least one of the mer units $R^3$ is null.

18. The electrolyte of claim 6 wherein M is Lithium.

19. The electrolyte of any of claims 1–18 having a weight average molecular weight in the range of approximately 10,000 to 3,000,000.

20. The electrolyte of any of claims 1–18 having a weight average molecular weight in the range of approximately 100,000 to 1,000,000.

* * * * *